(No Model.)

G. G. BUCKLAND.
VEHICLE GEAR.

No. 249,581. Patented Nov. 15, 1881.

Witnesses
Geo. H. Strong.
Frank D. Brooks

Inventor
George G. Buckland.
By Dewey & Co.
Attys

UNITED STATES PATENT OFFICE.

GEORGE G. BUCKLAND, OF TULARE, CALIFORNIA.

VEHICLE-GEAR.

SPECIFICATION forming part of Letters Patent No. 249,581, dated November 15, 1881.

Application filed August 15, 1881. (No model.)

*To all whom it may concern:*

Be it known that I, GEORGE G. BUCKLAND, of Tulare, county of Tulare, State of California, have invented new and useful Improvements in Running-Gear for Vehicles; and I hereby declare the following to be a full, clear, and exact description thereof.

My invention relates to the class of vehicles, and more especially to the gear thereof, and to certain improvements therein, the object of which is simplicity and economy in construction, together with durability and effectiveness in use, as will be fully explained hereinafter.

These improvements consist in a peculiar construction of the springs, and in the means for securing them to the axle and head-block, the latter of which is specially adapted to receive them; also in a cross-brace and a novel center spring riveted to said cross-brace and extending forward under the axle and up in front, past both axle and head-block, and back upon itself, forming a spring-loop, through which the king-bolt passes, the advantages of which will be hereinafter set forth.

Figure 1:
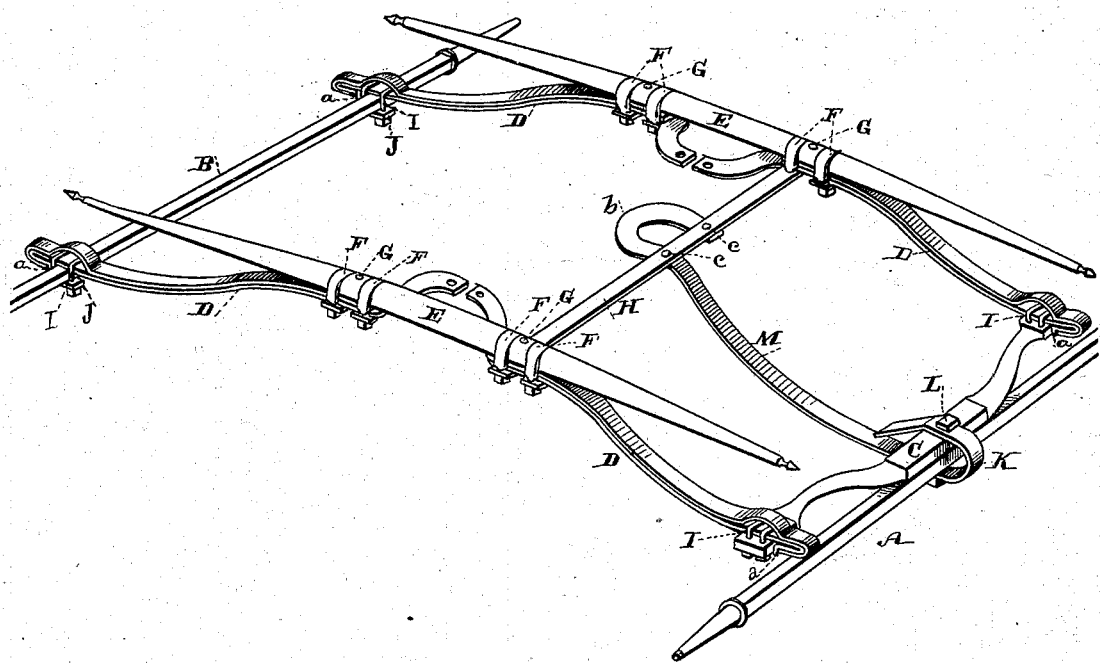
Figure 2:
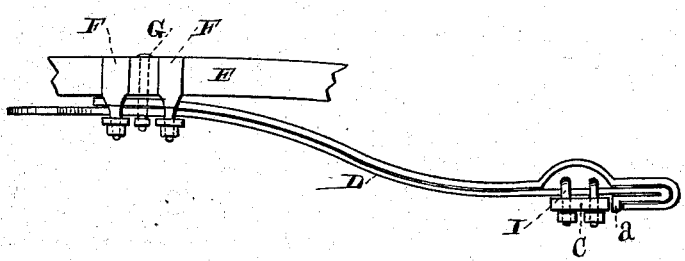

Referring to the accompanying drawings, Figure 1 shows a perspective of my gear. Fig. 2 shows a detail thereof.

Let A represent the forward axle, and B the rear axle.

C represents the head-block. This is made of one piece of iron, having a flat center, resting on the forward axle and upturned ends, as shown. These ends are flattened out and bolt-holes made through them to receive the clips hereinafter mentioned.

D D represent springs. These are leaf-springs; but, instead of being made in one continuous arch on each side, they are made in two pieces—that is, there are two front springs extending from the head-block backward toward the center, and there are two rear springs extending from the rear axle forward toward the center. Their ends do not meet, but are a little distance apart, as shown.

E represents side bars. The springs D D are clipped to these side bars underneath by the clips F, which pass down on each side of them, and are secured underneath by clip-yokes and nuts. The inner ends of the springs are bent inwardly between the side bars and have bolt-holes, as shown. These form four bearings or supports between the side bars, and upon them the body of the vehicle rests, being bolted thereto through the holes in the ends of the springs. Between the clips F the springs are further secured to the side bars by bolts G.

H represents a cross-brace extending between the sides of the gear and under the forward springs. This brace is a flat bar of iron, and is in a position just under where the rear clips of the forward springs come. The clips pass down through this brace and are secured by nuts underneath, so that said brace acts as a clip-yoke at those points. The purpose of the brace is to keep the gearing square and firm. The springs D D pass forward and back from the center, curving downward to the head-block and rear axle. The under leaf lies upon the flat ends of the head-block and extends beyond a few inches, when it is bent back and downward at right angles in a portion marked *a*. This portion *a* lies against the edge of the head-block, forming a brace or shoulder for the spring. Clips I embrace this leaf and pass down through the holes in the ends of the head-block, and are secured underneath by nuts. The ends of the head-block themselves serve as yokes for the clips, and no others are required. The second leaf curves upward, above and over the clips I, and its end is bent over and under the end of the under leaf, thus clasping it. Its end does not quite touch the portion *a* of the under leaf.

It will be seen that the second leaf is not clipped at all, and is perfectly free for the required play of two leaves of the spring upon one another. This construction is for the purpose of security. In case the lower leaf should break, the upper leaf would still have hold of the end of the lower and maintain the connection. The rear springs have a similar construction, but are secured to the axle in a slightly different manner, arising out of the fact that the axle cannot be flattened out as the head-block, and therefore the clips must have yokes.

It will be seen that the clips I pass down on each side of the axle, and are secured by transverse yokes J and nuts under the axle. The springs D D are secured in three places—once to the body, a second to the side bars, and a third to the head-block and rear axle. They are therefore held rigid, and the gearing is kept perfectly square. The inner ends of the springs thus form suitable and firm bearings for the body and dispense with any other irons which are usually used as body-supports. The advantage of this is in the rigidity of the support and its economy.

Under the cross-brace H, and riveted thereto, is a center spring, M. This is bent around, as shown at b, and has its end riveted to the cross-brace, and is riveted thereto again, both points being indicated by c c. From the cross-brace it extends forward in a downward curve and passes under the forward axle, projecting beyond somewhat. It is then turned upward past the axle and head-block and back again over the head-block and separate therefrom a little, and is then bent down almost to itself, but does not touch. This forms a spring-loop, which, for convenience, I designate by K. It is not closed tight about the head-block and axle, it being loose, so as to be jammed by the nut upon the king-bolt. The king-bolt L passes down through the top of the loop, the head-block, axle, and bottom of the loop, and is secured underneath by an appropriate nut, which is screwed up tight upon the loop K. This spring-loop K is large enough to allow the free play of the head-block, and acts as a coupling for the king-bolt. On account of its springy nature it acts as a jam-nut to hold the nut securing the king-bolt firm and prevent it from shaking loose, thus dispensing with all rubbers and multiplicity of irons and fifth-wheel connections. For a like reason it acts as an anti-rattler by taking up the play of the nut, if worn. Another advantage is, that it lends security to the vehicle in case the king-bolt should break, because the axle and head-block are within the loop, and the draft would be upon said loop, instead of the king-bolt, in case the latter should break. The body would not be let down in the road by the front wheels being separated therefrom. The center spring, M, lends additional spring to the vehicle and additional strength. Being connected with the cross-brace, which is connected with the side bars, it is obvious that the center spring is brought into use by the springing of the main springs D D. The center spring, being connected in three places, as shown at c c, and by the king-bolt in front, remains perfectly square and assists in keeping the whole gear square by holding the cross-brace rigid. The springs D D, being secured directly to the axle and head-block, require said parts to separate when the springs are pressed down. By having the center spring, M, curved, as shown, this separation is not prevented, as would be the case if the said spring were straight. Another advantage of this spring is that as the draft is upon the forward axle the strain comes partly upon the central spring, and by being looped as it is it prevents the objectionable tendency of the axle to roll or rock.

It will be seen that in my springs I have no working joints, and therefore there can be no wear or rattle.

This gearing is as applicable to a buckboard as to any other form of body or frame.

Having thus described my invention, what I claim as new, and desire to secure by Letters Patent, is—

1. In a vehicle-gear, the springs D D, having the end of their lower leaf projecting beyond and turned back and downward against the rear axle and head-block, and clipped thereto, as shown, and their second leaf curved up over the clips and bent around the end of the lower leaf to form a catch or clasp, substantially as and for the purpose herein described.

2. In a vehicle-gear, the front and rear side springs, D D, bolted and clipped to the side bars, E, their outer ends being formed and clipped to the rear axle and head-block, as shown, and their other ends being turned inwardly, forming bearings or supports for a body or frame which is secured thereto, substantially as herein described.

3. In a vehicle-gear, the forward side springs, D D, clipped and bolted to the side bars, E, and having their ends constructed as shown, in combination with the head-block C, having flattened ends provided with bolt-holes, said springs being clipped to the flattened ends of the head-block by means of clips F, passing through said holes and secured by nuts beneath, substantially as described.

4. In a vehicle-gear, the combination of the springs D with their inturned ends, the side bars, E, and the cross-brace H, when arranged substantially as and for the purpose shown.

5. In a vehicle-gear, the curved center spring, M, having its rear end riveted beneath the vehicle and its forward end formed into a spring-loop, K, loosely embracing the forward axle and head-block and receiving the king-bolt, substantially as and for the purpose herein shown.

6. In a vehicle-gear, the cross-brace H, forward axle, A, and head-block C, in combination with the center spring, M, having a curved rear end riveted to the cross-brace at c c, and having a spring-loop, K, upon its forward end, loosely embracing the axle and head-block and receiving the king-bolt L, substantially as and for the purpose herein described.

In witness whereof I have hereunto set my hand.

GEORGE GARDNER BUCKLAND.

Witnesses:
S. H. NOURSE,
WM. F. BOOTH.